Dec. 18, 1928.
P. C. LYDON
1,695,597
AGITATOR FOR FEEDERS
Filed June 20, 1927
2 Sheets-Sheet 1
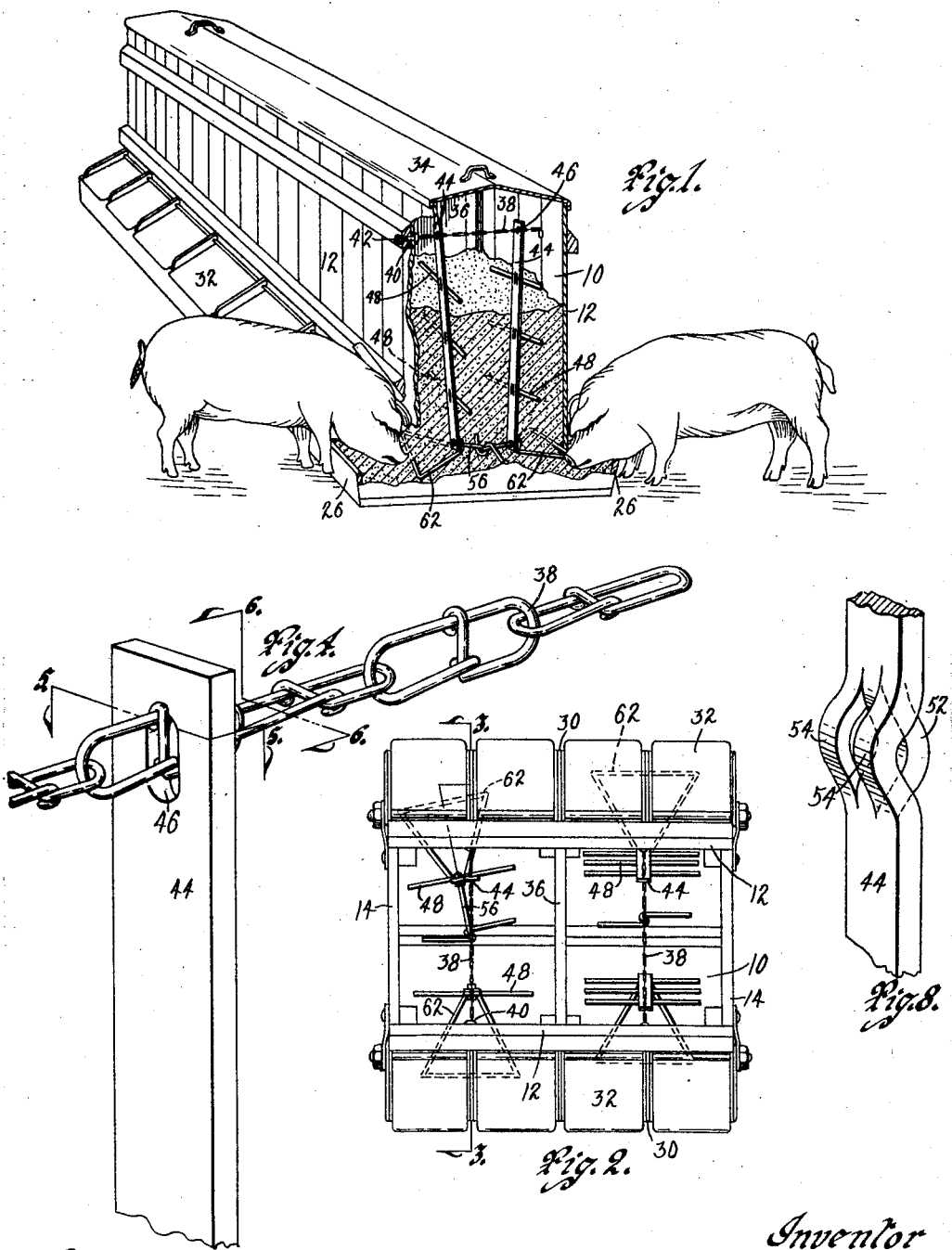
Witness
L. F. Sandberg
Inventor
Patrick C. Lydon
by Bair & Freeman Attorneys Dec. 18, 1928. 1,695,597
P. C. LYDON
AGITATOR FOR FEEDERS
Filed June 20, 1927 2 Sheets-Sheet 2
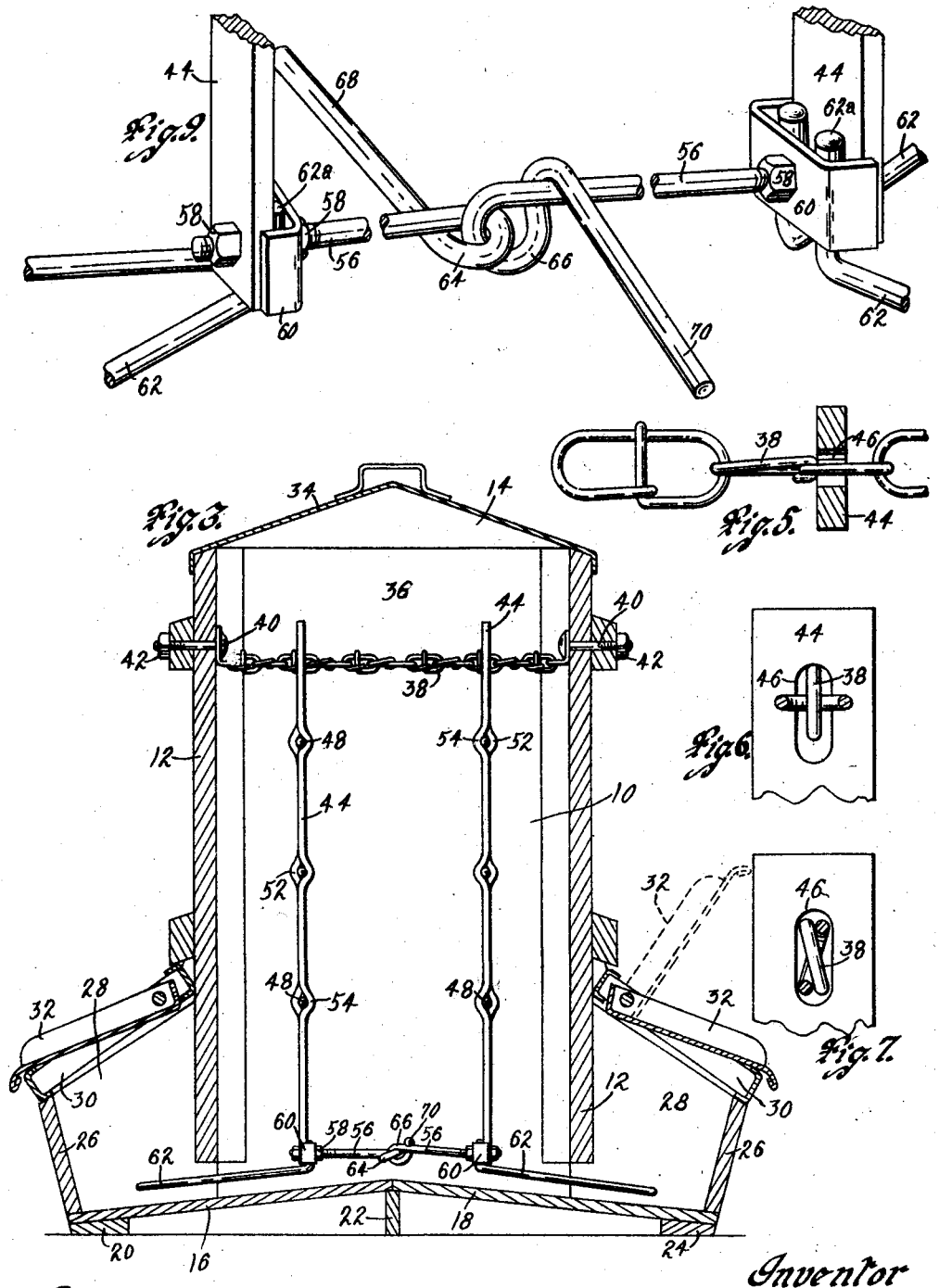
Witness
L. F. Sandberg
Inventor
Patrick C. Lydon
by Bair & Freeman
Attorneys Patented Dec. 18, 1928.

1,695,597

UNITED STATES PATENT OFFICE.

PATRICK C. LYDON, OF DES MOINES, IOWA, ASSIGNOR TO DES MOINES SILO & MANUFACTURING COMPANY, OF DES MOINES, IOWA, A CORPORATION OF IOWA.

AGITATOR FOR FEEDERS.

Application filed June 20, 1927. Serial No. 199,987.

The object of my invention is to provide an agitator of very simple, durable and inexpensive construction for agitating the feed in animal self-feeders.

More particularly, it is my purpose to provide an agitator of this kind, which can be conveniently, easily and quickly mounted in different feeders or feed compartments thereof.

Another purpose is to provide such an agitator so constructed and arranged as to afford quick and easy adjustment of the agitator for different feeders and conditions.

Another purpose is to provide such a device so arranged as to afford constant agitation of the feed when animals are feeding therefrom.

It is my purpose to provide a number of important features of structure, which will be hereinafter more particularly referred to.

With these and other objects in view, my invention consists in the construction, arrangement and combination of the various parts of my agitator, whereby the objects contemplated are attained, as hereinafter more fully set forth, pointed out in my claims, and illustrated in the accompanying drawings, in which:

Figure 1 is a perspective view, parts being broken away and parts being shown in section, of a feeder equipped with an agitator structure embodying my invention.

Figure 2 is a plan view of a slightly different feeder and agitator with the lid thereof removed.

Figure 3 is a transverse, sectional view taken on the line 3—3 of Figure 2.

Figure 4 is a perspective view illustrating the manner of supporting the agitator on the chain.

Figure 5 is a detail, sectional view taken on the line 5—5 of Figure 4.

Figure 6 is a detail, sectional view taken on the line 6—6 of Figure 4.

Figure 7 is a detail, sectional view similar to that shown in Figure 6 with the chain relaxed.

Figure 8 is a perspective view of a portion of one of the uprights, parts being shown in section and parts being broken away; and Figure 9 is a perspective view of the lower part of the agitator structure, parts being broken away and parts being shown in section.

I will first describe a feeder in which my improved agitator may be used and then will describe the construction of the agitator and the manner of installing it in the feeder.

My improved feeder comprises a hopper or reservoir indicated generally by the reference numeral 10 having the side walls 12 terminating above the bottom hereinafter described and the end walls 14.

Secured between the end walls are the bottom members 16 and 18, which are inclined slightly downwardly and outwardly from the center line of the feeder as shown in Figure 3 and are provided on their under sides with the supporting members 20, 22 and 24.

Extending upwardly from the outer edge of each bottom member 16 and 18 is a short wall 26 forming the outer member of a trough.

It will be understood that the bottom members 16 and 18 project laterally beyond the walls 12 to form the troughs on each side of the hopper and that the end members 14 are so shaped as to form the ends of the hopper 10 and also the ends of the trough.

The troughs I indicate generally by the numeral 28.

The troughs are provided with divider bars 30 extending across them to keep the hogs from interfering with each other. The trough compartments between the successive bars 30 are preferably provided with hinged cover members 32.

The hopper is provided with a removable cover 34. The hopper may be divided by partitions 36 shown in Figure 2 into several compartments to receive feed of different kinds.

I will now describe my improved agitator. This consists of a chain 38 having connected with its ends the bolts 40 adapted to be extended through the opposite walls 12 and held in position by nuts 42. Supported on each chain 38 is a pair of spaced bars 44. Each bar is provided at its upper end with a vertical, elongated hole 46 to receive the chain. This hole is of such size and shape that when the chain is taut, as shown in Figures 3, 4 and 5, the uprights 44 will be held on one link and can not travel on the chain. Thus the link which is in the hole 46 when the chain is taut is in a vertical plane and the links connected with it are in horizontal planes. (See Figures 5 and 6).

When the chains are released, however, the links can be twisted with relation to each other, so that they may be successively slipped through the hole 46. (See Figure 7).

It is thus possible to adjust the uprights 44 to any distance spaced apart on the chain 38 and when the chain is then stretched tight, the uprights can not travel on the chain.

This provides a convenient way for spacing the uprights 44 on the chain 38.

At various heights on each upright, I preferably provide cross bar agitator fingers or rods 48. These rods or fingers 48 are preferably mounted on the upright bars 44 in the following manner:

Two slits 50 are cut longitudinally in spaced relation in the bar 44 and the material in the center is forced in one direction to form a curved receiving member 52, and the material on the opposite sides thereof is forced in the opposite direction to form the curved receiving members 54. (See Figure 8.)

The agitator rods or fingers 48 are then slipped between the members 54 and the member 52 in each instance.

At the lower end of each upright 44 is an actuator projected into the troughs, and I also provide means for connecting together the two members 44 on one chain 38 and the two actuator members last mentioned.

Referring now to Figure 9, it will be noted that a rod 56 is extended through the lower end of each upright 44. The portion of the rod 56 extended through the upright is threaded to receive a lock nut 58 adjacent to what may be called the path of the upright 44.

On the other or front side of the upright 44 is a nut 58. Between the nut 58 and the upright 44 is a clip 60 in the form of a channel.

The projecting actuator mentioned above comprises a triangular-shaped member 62, the arms of which adjacent to the upright 54 converge and terminate in upward extensions 62ª, which are received and clamped between the clip 60 and the upright 44.

These actuators 62 project under the walls 12 into the troughs, so that the feeding hog will move them with his snout for operating the agitator.

The parts may be so located and arranged that each actuator 62 projects on both sides of one of the bars 30, so as to be in two adjacent trough compartments. (Figure 2.)

The rods 56 project toward each other and are twisted to form loosely engaging loops 64 and 66 and projecting actuator end members 68 and 70 extending substantially lengthwise of the hopper.

The agitators are made in units, each comprising one chain 38, two uprights 44 and their connected parts.

As many units may be employed as is desired.

I will now refer briefly to the manner of installation and operation of my improved agitator.

The uprights 44 are installed on the chain 38 and adjusted while the chain is loose to their proper spaced position.

The bolts 40 are then inserted in the sides 12 and the nuts 42 are screwed on until the chain is substantially taut.

It will, of course, be understood that a chain of this kind will always swing somewhat, so as to allow swinging movement of the uprights 44 lengthwise of the hopper; and that the members 44 can swing laterally on the links on which they are received.

The chain 38 is adjusted to such height that the triangular agitators 62 rest just above the bottom members 16 and 18 slightly spaced therefrom and projecting into the troughs as shown in Figure 3.

The triangular-shaped member 62 in each case is below one of the bars 30, so that it may be agitated by a hog eating on either side of the bar 30 above the triangular actuator.

It will thus be seen that all or any of four hogs may operate the agitator at the same time.

In Figure 2, I have shown one of the agitators as at A swung to one side and one as at B swung inwardly.

It will be seen that if a hog engages any part of the triangular member 62, the vibration or motion given to that member will be transmitted to the upright 44 on which it is mounted and thus to the cross rods 48 and through the rods 56 to the opposite upright 44 and the other agitator 62.

This is of some importance because it insures enough movement of the agitator, which is somewhat hard to secure, because an agitator of this kind does not swing freely when the hopper has ground feed or the like in it.

The uprights have practically universal movement with relation to the chain and this affords a great variety of possible movements for the members 62. I find the chain 38 much more effective than a bar to which the uprights 44 might be pivoted.

I claim as my invention:

1. In a structure of the class described, a hopper, troughs communicating with the lower part of the hopper on opposite sides thereof, a chain, means for supporting said chain in substantially horizontal position in the hopper, a pair of upright members loosely supported in spaced relation on said chain, and opposite laterally projecting actuator elements at the lower ends of said members projecting into the respective troughs and having jointed connection with each other.

2. In a structure of the class described, a hopper, troughs communicating with the lower part of the hopper on opposite sides thereof, a pair of spaced upright members loosely pivoted in the hopper at their upper ends, actuator elements at the lower ends of said members projecting laterally into the respective troughs, and means for affording a loose joint connection between said actuator elements.

3. In a structure of the class described, a hopper, a trough communicating with the lower part of the hopper, a chain supported in the hopper, means for holding the chain stretched in substantially horizontal position, an upright member hung on said chain having a hole receiving the chain of a size which will not travel on the chain when the chain is taut, but will permit travel of said member on the chain when the chain is flexed.

4. In a structure of the class described, a hopper, troughs communicating with the hopper at its lower part on opposite sides thereof, a chain, means for holding the chain stretched in substantially horizontal position in the hopper, a plurality of upright members hung on said chain having holes receiving the chain of a size which will not travel on the chain when the chain is taut, but will permit travel of said members on the chain when the chain is flexed, and means affording a loose jointed connection between the lower ends of said upright members.

5. In a device of the class described, a feeder comprising a reservoir portion, troughs at the lower end of the reservoir portion extending in opposite directions therefrom, said troughs having cross members for dividing them into compartments, a chain stretched between the upper portions of the walls of said reservoir, upright agitator members hung on said chain, actuator elements projecting from the lower ends of said upright members, each actuator element projecting into two compartments of one of said troughs, and means affording a loose joint connection between said actuator elements at the lower ends of said upright member.

6. In a structure of the class described, a hopper with a trough projecting from the lower end thereof and in communication therewith, a chain stretching across the upper part of said hopper, an upright loosely hung on said chain having an actuator element on its lower end projecting into said trough, said last-named actuator element being of triangular form, said trough having a divider bar above said triangular actuator element, whereby animals feeding on opposite sides of the bar may engage the agitator element.

7. In a device of the class described, a hopper, troughs communicating with the lower part of the hopper on opposite sides thereof, a pair of loosely supported, spaced upright members in the hopper, a triangular agitator at the lower end of each upright having arms converging and formed with adjacent upward extensions, means for clamping said extensions of the respective triangular agitator elements to the respective uprights, and means for affording a loose jointed connection between the lower ends of the uprights.

8. In a structure of the class described, a hopper, troughs communicating with the lower part of the hopper on opposite sides thereof, a pair of spaced upright members loosely pivoted in the hopper at their upper ends, actuator elements at the lower ends of said members projecting laterally into the respective troughs, and means for affording a loose joint connection between said actuator elements, provided with a projecting actuating part within the lower part of the hopper.

Des Moines, Iowa, May 31, 1927.

PATRICK C. LYDON.